United States Patent
Ben Dror et al.

(10) Patent No.: US 9,497,079 B2
(45) Date of Patent: Nov. 15, 2016

(54) METHOD AND SYSTEM FOR ESTABLISHING, BY AN UPGRADING ACCELERATION NODE, A BYPASS LINK TO ANOTHER ACCELERATION NODE

(71) Applicants: Eran Ben Dror, Kfar Saba (IL); Or Igelka, Ramat Gan (IL)

(72) Inventors: Eran Ben Dror, Kfar Saba (IL); Or Igelka, Ramat Gan (IL)

(73) Assignee: SAP SE, Walldorf (DE)

( * ) Notice: Subject to any disclaimer, the term of this patent is extended or adjusted under 35 U.S.C. 154(b) by 675 days.

(21) Appl. No.: 13/917,222

(22) Filed: Jun. 13, 2013

(65) Prior Publication Data
US 2014/0372504 A1    Dec. 18, 2014

(51) Int. Cl.
*G06F 15/16*    (2006.01)
*H04L 12/24*    (2006.01)

(52) U.S. Cl.
CPC ......... *H04L 41/0816* (2013.01); *H04L 41/082* (2013.01); *H04L 41/0836* (2013.01)

(58) Field of Classification Search
CPC .............. H04L 41/082; H04L 41/0836; H04L 41/0816
USPC .......... 709/202, 238, 239; 370/242; 717/168
See application file for complete search history.

(56) References Cited

U.S. PATENT DOCUMENTS

| | | | |
|---|---|---|---|
| 4,714,992 A | 12/1987 | Gladney et al. | |
| 5,008,814 A | 4/1991 | Mathur | |
| 5,155,847 A | 10/1992 | Kirouac et al. | |
| 5,421,017 A | 5/1995 | Scholz et al. | |
| 5,751,454 A * | 5/1998 | MacDonald | H04J 14/0212 370/222 |
| 5,946,647 A | 8/1999 | Miller et al. | |
| 6,035,423 A | 3/2000 | Hodges et al. | |
| 6,055,569 A | 4/2000 | O'Brien et al. | |
| 6,269,456 B1 | 7/2001 | Hodges et al. | |
| 6,360,366 B1 | 3/2002 | Heath et al. | |
| 6,976,079 B1 | 12/2005 | Ferguson et al. | |
| 7,356,259 B1 * | 4/2008 | Haggans | H04J 14/0227 385/16 |
| 7,356,577 B2 | 4/2008 | Collins | |
| 7,440,996 B2 | 10/2008 | Gebhart | |
| 7,558,822 B2 | 7/2009 | Fredricksen et al. | |
| 7,565,084 B1 * | 7/2009 | Wach | H04J 14/04 398/183 |

(Continued)

FOREIGN PATENT DOCUMENTS

| | | | |
|---|---|---|---|
| CN | 102148709 | 8/2011 | |
| FR | 2879386 | 6/2006 | |
| FR | EP 2466809 A1 * | 6/2012 | ............. H04L 45/38 |

OTHER PUBLICATIONS

U.S. Appl. No. 13/362,206, filed Jan. 31, 2012 entitled "Unified Software Build System", 22 pages.

(Continued)

*Primary Examiner* — Oanh Duong
(74) *Attorney, Agent, or Firm* — Fish & Richardson P.C.

(57) ABSTRACT

Performing operations on nodes of distributed computer networks. A request to upgrade a first acceleration node in a computer network is identified. A second acceleration node that is linked to the first acceleration node is identified. A bypass link to the second acceleration node from the first acceleration node is established. The bypass link is configured to transmit new connections received for handling by the first acceleration node to the second acceleration node for handling by the second acceleration node during upgrading of the first acceleration node. Upon establishing the bypass link, the first acceleration node is upgraded in response to identifying the request.

20 Claims, 4 Drawing Sheets

(56) References Cited

U.S. PATENT DOCUMENTS

| | | |
|---|---|---|
| 7,941,609 B2 | 5/2011 | Almog |
| 7,950,010 B2 | 5/2011 | Goger et al. |
| 8,326,800 B2 | 12/2012 | Cunningham et al. |
| 8,375,383 B2 | 2/2013 | Bernabeu-Auban et al. |
| 8,417,991 B2 | 4/2013 | Venkataraja et al. |
| 8,479,187 B2 | 7/2013 | Driesen et al. |
| 8,527,471 B2 | 9/2013 | Hoprich et al. |
| 2002/0129179 A1* | 9/2002 | Chen .................... G06F 3/0613 710/58 |
| 2003/0002437 A1* | 1/2003 | Lu .......................... H04Q 3/68 370/228 |
| 2003/0028751 A1* | 2/2003 | McDonald .......... G06F 15/7864 712/34 |
| 2003/0177209 A1 | 9/2003 | Kwok et al. |
| 2006/0007927 A1* | 1/2006 | Lee ...................... H04L 12/42 370/389 |
| 2006/0095903 A1 | 5/2006 | Cheam et al. |
| 2007/0174849 A1* | 7/2007 | Cheung ................ G06F 9/4411 719/321 |
| 2009/0059947 A1* | 3/2009 | Barthel .............. G05B 19/0428 370/437 |
| 2009/0234906 A1* | 9/2009 | Chai ........................ G06F 8/67 709/203 |
| 2010/0023925 A1 | 1/2010 | Shribman et al. |
| 2010/0098092 A1 | 4/2010 | Luo et al. |
| 2010/0162226 A1 | 6/2010 | Borissov et al. |
| 2012/0089664 A1 | 4/2012 | Igelka |
| 2012/0246339 A1* | 9/2012 | Huang .................. H04L 49/557 709/239 |
| 2014/0347981 A1* | 11/2014 | Rangne ..................... H04L 1/22 370/228 |
| 2015/0288443 A1* | 10/2015 | Foxworthy ........ H04B 7/18582 370/316 |

OTHER PUBLICATIONS

Communication and extended European search report for EPO Application No. 14002014.0-1853 mailed Oct. 14, 2014; 6 pages.

* cited by examiner

METHOD AND SYSTEM FOR ESTABLISHING, BY AN UPGRADING ACCELERATION NODE, A BYPASS LINK TO ANOTHER ACCELERATION NODE

TECHNICAL FIELD

This disclosure relates to computer-implemented methods, computer-readable media and computer systems for managing a computer network environment that includes interconnected computer systems.

BACKGROUND

A distributed network includes multiple computer systems, e.g., one or more client computer systems, one or more server computer systems, other computer systems, that communicate with each other through a computer network. The multiple computer systems in the distributed network operate cooperatively to perform tasks. A simplified example of a distributed network includes a desktop computer system connected to a server computer system over the Internet. Multiple computer nodes (e.g., routing computer systems) can be disposed along an information pathway between the client computer system and the server computer system. The computer systems can operate cooperatively to transmit requests for resources from the client computer system to the server computer system, and resources responsive to the requests from the server computer system to the client computer system over the Internet.

Periodically, operations, e.g., upgrades, repairs, maintenance and other suitable operations, can be performed on one or more of the computer systems in the distributed network. If a node of the distributed network is taken offline, i.e., disconnected from the network, to perform such operations, downtime can result affecting the availability of the network to perform tasks such as those described in the example above.

While generally described as computer-implemented software embodied on tangible media that processes and transforms the respective data, some or all of the aspects may be computer-implemented methods or further included in respective systems or other devices for performing this described functionality. The details of these and other aspects and implementations of the present disclosure are set forth in the accompanying drawings and the description below. Other features and advantages of the disclosure will be apparent from the description and drawings, and from the claims.

Like reference numbers and designations in the various drawings indicate like elements.

DETAILED DESCRIPTION

Figure 1A:
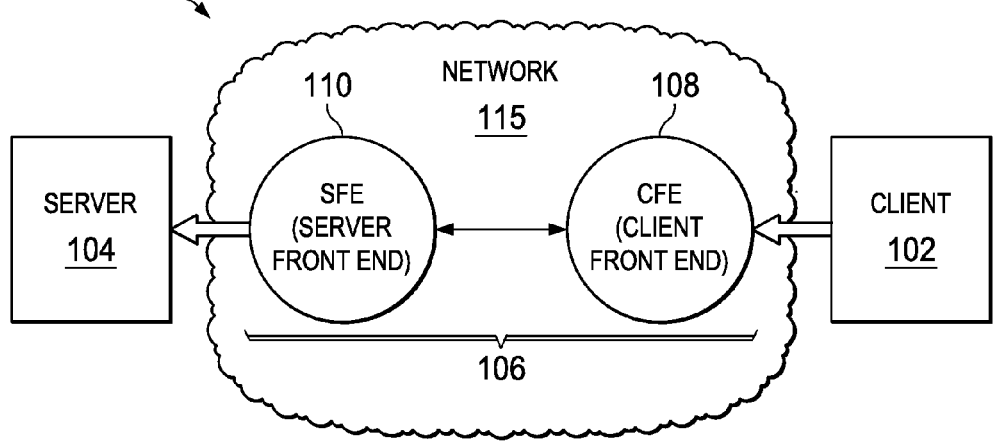
FIGS. 1A and 1B illustrate examples of data flow in a distributed computer network.
Figure 1B:
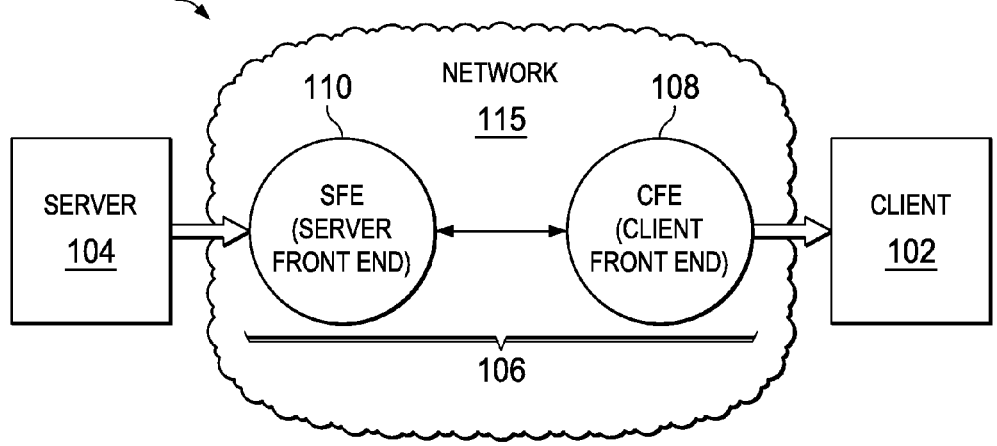

This disclosure describes computer-implemented methods, computer-readable media, and computer systems for performing operations on nodes of distributed computer networks. A distributed computer network 100 (FIGS. 1A, 1B) includes one or more client computer systems 102 connected to one or more server computer systems 104 through one or more computer nodes 106. Each computer node is a device capable of routing data, e.g., a computer system, a router, a switch, a hub, or any suitable data exchanging device. Data, e.g., requests, resources, and other suitable data, can be exchanged between the one or more client computer systems 102 and the one or more server computer systems 104 through the computer nodes 106. For example, as shown in FIG. 1A, a request from a client computer system can be received by a first computer node, and either transmitted directly to a client computer system or transmitted to a second computer node for transmission to a server computer system. FIG. 1B shows data flow in a direction opposite to that of FIG. 1A in which resources stored on the server computer system are routed to the client device from which the request was received.

A client computer system 102 can be, e.g., a desktop computer, a laptop computer, a tablet computer, a smartphone, a personal digital assistant (PDA), any type of mobile device, or any suitable client computer system that can receive or transmit data (or both). The client computer system 102 can be configured to be connected to one or more wired or wireless networks 115, e.g., the Internet, a Local Area Network (LAN), a Wide Area Network (WAN), a Wi-Fi network, or other suitable network. A user of the client computer system 102 can transmit requests for resources over the network 115.

A server computer system 104 can be similar to a client computer system 102. Alternatively, or in addition, the server computer system 104 can be implemented as multiple entities. For example, a resource can be distributed across the multiple entities. In addition, each entity can store respective resources. The server computer system 104 can be configured to be connected to the one or more wired or wireless networks 115, to receive requests for resources from one or more client computer systems 102, and to provide resources in response to the requests.

A computer node 106 can be a computer system configured to route transmissions received from any entity in the network (e.g., a client computer system 102 or a server computer system 104 or another computer node) to any other entity in the network. One or more computer nodes 106 can be client front ends 108 (CFEs), each of which acts, on the one hand, as a client computer system that consumes network services from server front ends 110, and, on the other hand, as a server computer system that provides other client computer systems 102 with the network services that it consumes. In this sense, a CFE acts as a reflector of the network services it consumes. One or more computer nodes can be server front ends 110 (SFEs), each of which acts, on the one hand, as a client computer system that consumes network services from other server computer systems 104, and, on the other hand, as a server computer system, providing CFEs 108 with the network services it consumes. In this sense, a SFE acts as a reflector of the network services it consumes.

In some implementations, a computer node can be an acceleration node that accelerates the transmission of data routed through the node. The acceleration node can implement acceleration software applications on an operating system. The acceleration node can be a soft appliance or a hardware device that internally implements the software application as a standalone box. For example, an acceleration node is configured to implement network optimizations for improving the performance of the distributed network. To do so, the acceleration node is configured to perform operations such as compress the data, cache the compressed data, utilize a dictionary of known data chunks to facilitate data transfer, and other suitable operations.

In the distributed network described here, an acceleration node can be a computer system configured to only accelerate data transmission. Alternatively, or in addition, an acceleration node can be a computer system, e.g., a CFE or an SFE, which is configured to accelerate data transmission in addition to implementing other functionalities. Certain operations can be periodically performed on the acceleration nodes. The operations can include, e.g., upgrades, repairs, maintenance, installation of software applications that modify functionalities of the acceleration nodes, or other suitable operations. Example techniques are described below with reference to upgrading the acceleration nodes that deliver resources (e.g., Internet resources) from server computer systems that host the resources (e.g., webpages of websites) to client computer systems. However, the techniques can be implemented to perform any operations (i.e., not just upgrading operations) on any node (i.e., not just an acceleration node) in any distributed computer network.

Upgrading an acceleration node can include uninstalling an existing version of a software application executed by the acceleration node and installing a new version. Upgrading can alternatively or in addition include installing patches to update specific binaries, e.g., the core functionality binary, or the user interface binary executed by the acceleration node. Upgrading may require disconnecting the acceleration node from the distributed computer network, e.g., by powering down the acceleration node or temporarily disabling the acceleration node from handling connections from other entities in the network. Doing so can result in downtime and can negatively affect the availability and/or the performance of the network, particularly if the acceleration node being disconnected is required for ensuring connectivity of the network. Moreover, if the upgrade procedure is complex, e.g., one that requires gradual and incremental steps, the network may experience additional downtime, which is undesirable.

This disclosure describes techniques to upgrade one or more or all acceleration nodes in a distributed computer network without introducing any downtime in the network. To do so, prior to commencing upgrading a first acceleration node, a bypass link from the first acceleration node to a second acceleration node is established such that new incoming connections to the first acceleration node are redirected to the second acceleration node for handling. Alternatively, the bypass link can redirect the new connections directly to a server computer system. Once the first acceleration node has completed handling existing, i.e., active connections, the first acceleration node is upgraded while new connections are redirected to the second acceleration node through the bypass link. After the upgrade, the first acceleration node is ready to once again communicate with other nodes in the distributed computer network. The bypass link is terminated and the upgraded first acceleration node begins to receive new connections. In this manner, downtime is eliminated because, although the first acceleration node was temporarily disconnected from the network, the functionality provided by the first acceleration node continued to be available through the bypass link.

Further, the upgrade procedure can be implemented autonomously, as described below. That is, after a user, e.g., a system administrator, initiates an upgrade of the first acceleration node, subsequent upgrades of other acceleration nodes can be initiated automatically and without user intervention. The first acceleration node can identify and initiate upgrade procedures on one or more other acceleration nodes. In this manner, the upgrade command gradually (e.g., virally) passes throughout the network from acceleration node to acceleration node through links that connect the acceleration nodes. In this manner, after the user initiates the upgrade of the first acceleration node, the distributed network works to upgrade itself without requiring further input from or interaction with the user.

Figure 2:
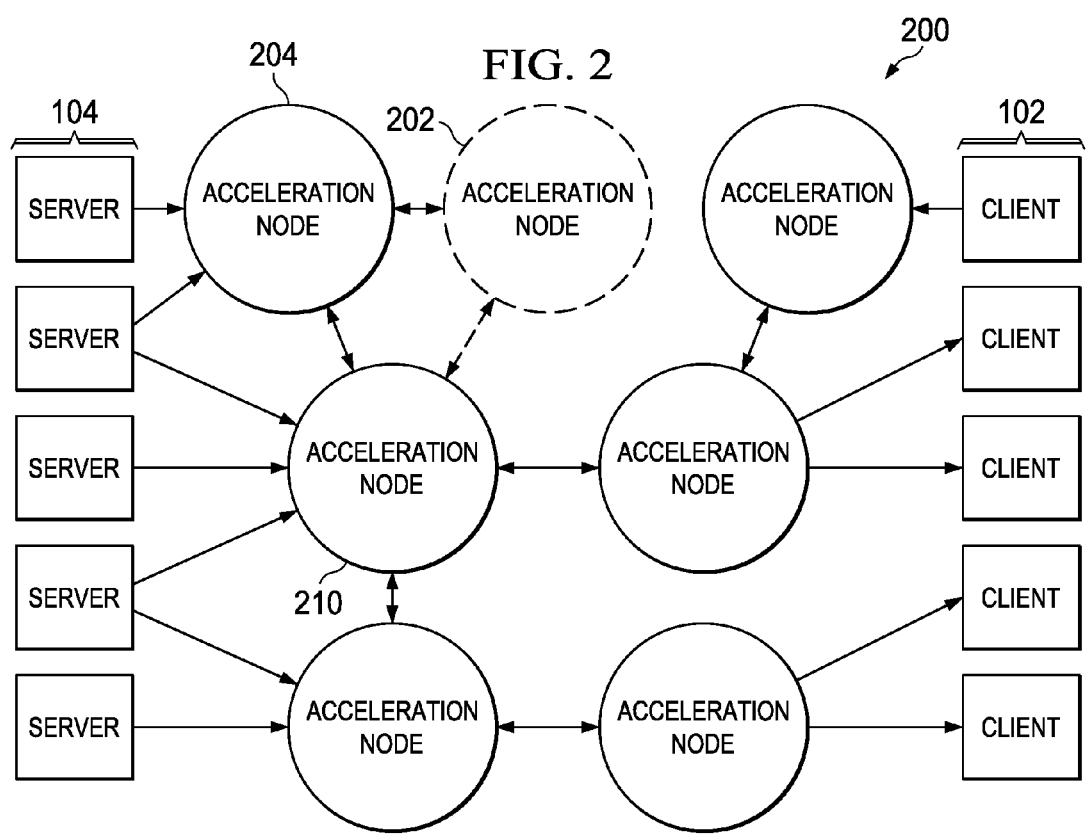
FIG. 2 illustrates multiple acceleration nodes in the distributed computer network of FIG. 1.

FIG. 2 illustrates multiple acceleration nodes in the distributed computer network 200. The distributed computer network 200 includes multiple client computer systems 102 and multiple server computer systems 104 connected through multiple acceleration nodes 106. Each entity in the network 200 is connected to another entity through a respective link through which data is exchanged. The acceleration nodes can include one or more CFEs and one or more SFEs. The acceleration nodes can autonomously perform upgrade procedures as described below.

In the acceleration node landscape shown in FIG. 2, a first acceleration node 202 is identified for upgrading. The user can initiate an upgrade of any acceleration node or, in some implementations, more than one acceleration node simultaneously. The upgrade procedure can start from the leaves or from the roots or from any other acceleration node in the network. The techniques described here can be implemented by the acceleration node that has been identified for the upgrade, i.e., the first acceleration node 202, in this example. Subsequent techniques related to upgrading can similarly be implemented by other acceleration nodes being upgraded. Consequently, while some implementations may include a central computer system to manage acceleration nodes and/or their upgrade, such a central computer system may not be necessary to upgrade the acceleration nodes.

Figure 3:
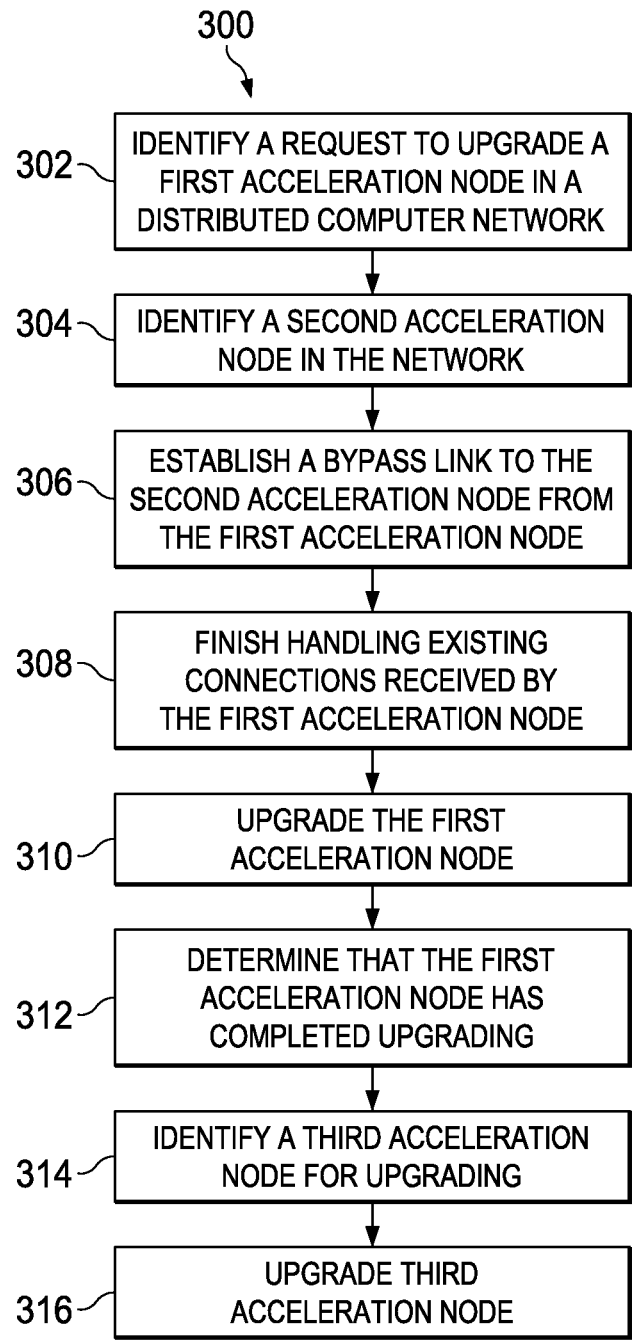
FIG. 3 is a flowchart of an example process to upgrade the acceleration nodes in the example distributed computer network of FIG. 2.

FIG. 3 is a flowchart of an example process 300 to upgrade the acceleration nodes in the distributed computer network 200. The process 300 can be implemented as computer instructions stored on a computer-readable medium and executable by data processing apparatus both included, e.g., in the first acceleration node 202. In general, each acceleration node shown in FIG. 2 can implement a process similar to the process 300 described below as being implemented by the first acceleration node 202. To do so, each acceleration node can include a respective computer-readable storage medium to store instructions executable by data processing apparatus to perform the operations described with reference to the first acceleration node 202.

At 302, a request to upgrade the first acceleration node 202 in the computer network is identified. For example, an administrator of the distributed computer network 200 can provide an input to upgrade the entire acceleration nodes landscape beginning with the first acceleration node 202. The administrator can provide, e.g., by uploading, the first acceleration node 202 with all the resources that the node needs for the upgrade. Alternatively, the administrator can instruct the first acceleration node 202 to access a repository that stores the resources needed for upgrading. The repository can be a computer system which consolidates configurations of delivered network services and is able to provide SFEs and CFEs with data about the network services, the network itself, and with data from the server computer systems. The repository is also capable of serving as a host for installation resources including upgrade resources, e.g., scripts, binaries, RPMs, ISOs, MSIs, installation packages, and other suitable resources.

In some implementations, the first acceleration node 202 can be provided with an input (e.g., an instruction) to upgrade the first acceleration node 202 immediately. Thus, in response to identifying the request to upgrade, the first acceleration node 202 can commence the upgrading process described here. Alternatively, the request to upgrade can specify an upgrading time at which the first acceleration node 202 is to commence the upgrading process. The upgrading time can be a time of day during which network traffic in the computer network 200 is slowest. In some implementations, the user who provides the request can identify the time of day, e.g., 2:00 am, and instruct the first acceleration node 202 to commence upgrading at the identified time. Alternatively, the first acceleration node 202 can be configured to analyze the network traffic for a period of time (e.g., one or more days, a week, or other suitable period of time), determine a time during the period when the network traffic is the slowest (e.g., at or around 2:00 am on each of the one or more days or the week), and establish the determined time as the upgrading time on a day following the period of time. In some implementations, the first acceleration node 202 can be configured to commence upgrading at time at which no connections to the first acceleration node 202 are detected.

At 304, a second acceleration node in the distributed computer network 200 can be identified. For example, the first acceleration node 202 can identify a second acceleration node 204 that is linked to the first acceleration node 202. In some implementations, the second acceleration node 204 can be the acceleration node that is logically closest to the first acceleration node 202. That is, the second acceleration node 204 is the fewest network hops away from the first acceleration node 202 relative to other acceleration nodes in the network 200.

Alternatively, the first acceleration node 202 can identify the second acceleration node 204 based on and/or in response to determining that the second acceleration node 204 is configured to handle connections and perform tasks that are substantially similar to the connections and tasks that the first acceleration node 202 is configured to handle. For example, the first acceleration node 202, a CFE, can identify the second acceleration node 204, another CFE. Conversely, both the first acceleration node 202 and the second acceleration node 204 can be SFEs.

In some implementations, the first acceleration node 202 can identify any acceleration node as the second acceleration node 204, and transmit, to the second acceleration node 204, a request to handle connections and perform tasks that are substantially similar to connections and tasks that the first acceleration node 202 is configured to handle. In some implementations, the first acceleration node 202 may not request the second acceleration node 204 to handle the connections and perform the tasks. Instead, the first acceleration node 202 can redirect connections that the first acceleration node 202 receives to the second acceleration node 204, which can handle the redirected connections like any other connections. In this sense, the redirection of requests will be transparent to the second acceleration node 204. For example, the first acceleration node 202 can transmit resources to the second acceleration node 204. Alternatively, the second acceleration node 204 may include functionality to handle connections similar to the first acceleration node 202. The request from the first acceleration node 202 to the second acceleration node 204 can include an instruction to activate the functionality. In some implementations, the first acceleration node 202 can provide the second acceleration node 204 with resources, e.g., computer instructions that the second acceleration node 204 can execute to provide the functionality that the first acceleration node 202 can provide.

Figure 4A:
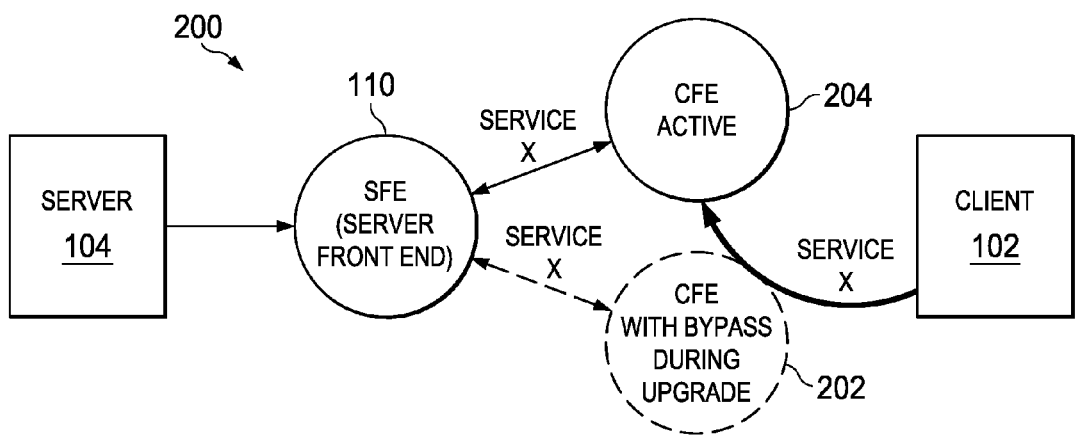
FIGS. 4A and 4B illustrate examples of establishing bypass links from a first acceleration node.
Figure 4B:
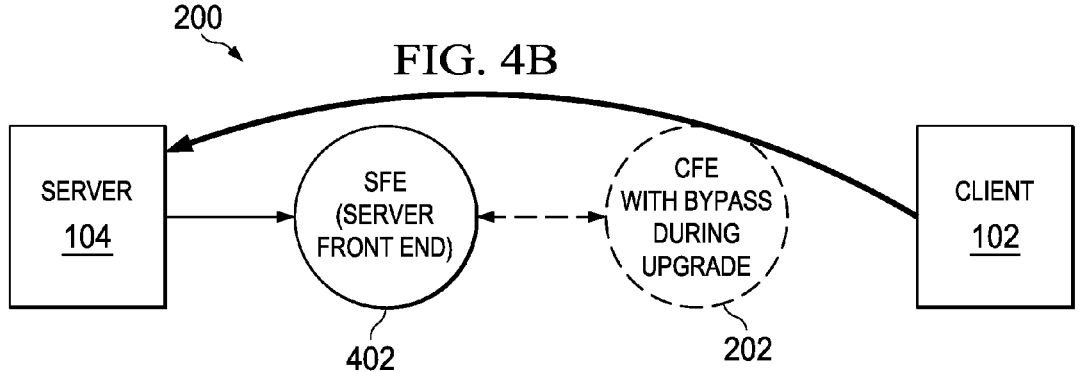

At 306, a bypass link to the second acceleration node 204 from the first acceleration node 202 can be established. The bypass link is configured to redirect new connections received for handling by the first acceleration node 202, e.g., from other nodes or from client/server computer systems, to the second acceleration node 204 for handling by the second acceleration node 204 during upgrading of the first acceleration node 202 (FIG. 4A). Alternatively, the bypass link can redirect new connections to the first acceleration node 202 directly to a server computer system 104 (FIG. 4B), thereby bypassing any intermediate acceleration node, CFE 202 or SFE 402.

The first acceleration node 202 can establish the bypass link either in software or in hardware or combinations of them. If the first acceleration node 202 includes a hardware component to route network traffic (e.g., a LAN card with a receiver), then the first acceleration node 202 can execute functionality to split the receiver into a first sub-receiver and a second sub-receiver, each of which can be operated as a logical entity for routing connections. In some implementations, the first acceleration node 202 can split the receiver using LXC (Linux Containers). The first acceleration node 202 can execute the first sub-receiver to not pass connections to the first acceleration node 202, and can execute the second sub-receiver to redirect the connections to the second acceleration node 204 or to the network node to which the bypass link is established. The bypass can be passive, stand-alone, one-sided, or combinations of them without a link such that the packets are forwarded on by the bypass to some node which does not currently respond to the packets. In this sense, the bypass can serve as a reflector as if the node from which a connection is received and a node to which the connection is redirected are communicating directly. In addition to not transmitting connections, the first sub-receiver can also be operated to perform upgrading operations, e.g., receipt of upgrade resources.

As an alternative to or in addition to splitting the receiver using LXC, the first acceleration node 202 can generate a temporary clone of itself, e.g., a temporary acceleration node that can perform all or relevant functionalities of the first acceleration node 202 prior to upgrading. Such a temporary clone can also be implemented, e.g., by utilizing LXC or other virtualization solutions. The temporary clone can also be implemented by setting up a clone machine, e.g., a clone VM of the first acceleration node 202, and diverting incoming traffic to the temporary clone.

At 308, existing connections received by the first computer node can be served. As described above, a feature of the upgrade procedure described here is an absence of network downtime. To achieve this feature, the first acceleration node 202 continues to receive connections when the bypass link described above is being established. Once the bypass link has been established, new connections are routed to the second acceleration node 204. However, connections received at the first acceleration node 202 while the bypass link was being established ("existing connections") still need to be served. The existing connections include links between computers or requests or resources or other data being routed through the first acceleration node 202. To do so, after establishing the bypass link and before upgrading the first acceleration node 202, the first acceleration node 202 handles the existing connections.

In some implementations, the first acceleration node 202 can be executed to handle the existing connections at a rate that is greater than that at which the first acceleration node 202 generally handles connections. For example, if the first acceleration node 202 has a functionality to increase acceleration, the functionality can be executed to increase the rate at which the first acceleration node 202 handles existing connections.

At 310, the first acceleration node 202 is upgraded both upon establishing the bypass link and upon determining that the first acceleration node 202 has completed handling the existing connections. The first acceleration node 202 receives all the resources needed for the upgrading and executes the received resources to upgrade itself. During the upgrade, the first acceleration node 202 can be disconnected from the network 200, i.e., unavailable to handle connections or route data. Nevertheless, the bypass link ensures that there is no network downtime.

At 312, it is determined that the first acceleration node 202 has completed upgrading. For example, the first acceleration node 202 can execute upgraded versions of software applications to bring back core functionalities of acceleration including, e.g., receiving connections, handling requests, and other core functionalities. The first acceleration node 202 can transmit a completion message to the bypass link after the first acceleration node 202 has completed upgrading. In a one-sided implementation, the first acceleration node 202 can transmit the completion message to no entity in specific. To overcome potential packet loss, the first acceleration node 202 can periodically transmit the completion message or for a pre-defined maximum amount of time (or both) with some waiting interval in between. The completion message can serve as a signal to the bypass link that the first acceleration node 202 is ready and that the bypass link can stop redirecting connections to the second acceleration node 204.

When the first acceleration node 202 transmits the completion message to the bypass link, the bypass link may still be routing connections to the second acceleration node 204 for handling by the second acceleration node 204. In implementations of a temporary clone, the clone may still be handling connections. If the bypass link (or the clone) were terminated immediately upon receiving the completion message, then the connections may not be handled or may be improperly routed to the second acceleration node 204 resulting in errors. Consequently, the second acceleration node 204 (or the clone) handles the connections being transmitted through the bypass link after the first acceleration node 202 has completed upgrading and has transmitted the completion message. Once the second acceleration node 204 (or the clone) has completed handling the connections, then the bypass link is terminated.

At 314, a third acceleration node 210 in the computer network 200 can be identified for upgrading after the first acceleration node 202 has completed upgrading. The autonomous nature of the computer network 200 described above enables the first acceleration node 202 to identify the third acceleration node 210 automatically and without user intervention. The autonomous nature also allows upgrading each acceleration node in the computer network 200 without requiring that an administrator access each node independently. Instead, using the links that connect two acceleration nodes, the request to upgrade and resources used for upgrading can be passed from an acceleration node, e.g., the first acceleration node 202, to one or more acceleration nodes. As an alternative to providing the upgrade resources, the one or more acceleration nodes can be directed to the repository that stores such resources. Thus, in some implementations, the first acceleration node 202 can execute functionality to identify one or more other acceleration nodes to be upgraded.

The first acceleration node 202 can identify in the computer network 200 any node that has not yet been upgraded as the third acceleration node 210. In some implementations, the third acceleration node 210 might have been disconnected from the computer network 200 when the request to upgrade the first acceleration node 202 was received. When the first acceleration node 202 has completed upgrading, it can be determined, e.g., by the first acceleration node 202, that the third acceleration node 210 has been reconnected to the computer network 200. Accordingly, the first acceleration node 202 can identify the third acceleration node 210 as the subsequent acceleration node to be upgraded.

In some implementations, either the first acceleration node 202 or the identified third acceleration node 210 (or both) can be configured to intelligently identify a subsequent acceleration node for upgrading, as described below. For example, an order in which the acceleration nodes are to be upgraded can be determined and made available to the acceleration nodes in the computer network 200. An acceleration node that has been upgraded can identify a subsequent acceleration node based on the order. Alternatively or in addition, the acceleration node that has been identified can determine that there are no other acceleration nodes in the computer network 200 that need to be upgraded according to the order before the identified acceleration node.

In some implementations, the third acceleration node 210 can be identified based on a functionality executed by the third acceleration node 210. For example, the order of upgrading acceleration nodes can specify that the third acceleration node 210, a CFE, which executes a first functionality, should be upgraded before a fourth acceleration node, a SFE, which executes a second functionality (or vice versa). Alternatively, the order can specify that specific CFEs that provide certain functionalities should be upgraded before specific SFEs that offer different functionalities are upgraded.

In some implementations, the third acceleration node 210 can be identified based on a priority of the third acceleration node 210. For example, the third acceleration node 210 and a fourth acceleration node can both be CFEs (or SFEs). A functionality executed by the third acceleration node 210 can have a greater priority than that executed by the fourth acceleration node. The order can specify that acceleration nodes with higher priority are to be upgraded before acceleration nodes with lower priority.

The first acceleration node 202 can use the links between the acceleration nodes to determine if the third acceleration node 210 is the proper node to be upgraded according to the order. Because the links are backward compatible, i.e., an upgraded acceleration node can exchange data with an acceleration node that has not yet been upgraded, the upgraded first acceleration node 202 can notify the third acceleration node 210 that it has completed upgrading, and that the third acceleration node 210 should commence upgrading. However, backward compatibility is optional and upgrading can occur without necessarily maintaining backward compatibility. To do so, all the CFEs can be upgraded first followed by all the SFEs, resulting in the CFEs successfully connecting to the SFEs using the new link protocol once the SFEs have been upgraded. Backward compatibility can also allow an acceleration node that has not yet been upgraded to exchange data with an acceleration node that has been upgraded. The backward compatibility that enables two-way data exchange can allow viral upgrading regardless of an order.

The first acceleration node 202 can do so either by the re-creation of the link to the third acceleration node 210, which, as described above, had temporarily been disabled while the first acceleration node 202 was being upgraded or by transmitting a unique message for this purpose. Upon being notified that the third acceleration node 210 is to be upgraded, the third acceleration node 210 can verify, based on the order, that it is the correct acceleration node to be upgraded. In this manner, the order of upgrading can be enforced and maintained.

In some implementations, the order can be created, e.g., manually or automatically (using a dedicated tool) as a customized list, e.g., one specific to a customer's network. The list can specify the order by which the acceleration nodes in the customer's network, e.g., the computer network 200, should be upgraded. The list can be provided to each acceleration node together with the input to commence upgrading. The list can include sequence constraints or parallel constraints (or both). That is, acceleration nodes can be specified to be upgraded after other acceleration nodes have completed upgrading or to be upgraded in parallel with the other acceleration nodes.

In some implementations, the order can be created by gathering information from the entire network through the links and executing upgrade preparation steps. The steps can determine a list similar to that described above based on the gathered information. When commencing an upgrade of an acceleration node, the list can be provided as input.

In some implementations, the upgrade procedure can be initiated without any predetermined list. Instead, the order in which the upgrading should proceed can be determined ad-hoc based on information which can dynamically be collected and utilized, e.g., a neighbors list. The order for upgrading can be created, in some implementations, based on a combination of one or more of the techniques described here. In this manner, the first acceleration node 202 can identify the third acceleration node 210 as the subsequent node for upgrading.

At 316, the third acceleration node 210 can be upgraded by implementing techniques similar to those described above with reference to the first acceleration node 202. Similarly to the first acceleration node 202, the third acceleration node 210 can implement the upgrading techniques described here. Some or all of the acceleration nodes in the network 200 can be similarly upgraded. Further, the third acceleration node 210 (and all acceleration nodes that are upgraded) can either be instructed to or be configured to commence upgrading at a particular time, e.g., when the network traffic is the lowest. Each acceleration node can be executed to collect relevant data for identifying the upgrading time. The data collected by all the nodes can be collected, e.g., by a central management system (e.g. the repository), which can analyze the collected data to identify an appropriate upgrading time.

Implementations of the subject matter and the operations described in this disclosure can be implemented in digital electronic circuitry, or in computer software, firmware, or hardware, including the structures disclosed in this disclosure and their structural equivalents, or in combinations of one or more of them. Implementations of the subject matter described in this disclosure can be implemented as one or more computer programs, i.e., one or more modules of computer program instructions, encoded on computer storage medium for execution by, or to control the operation of, data processing apparatus. Alternatively or in addition, the program instructions can be encoded on an artificially-generated propagated signal, for example, a machine-generated electrical, optical, or electromagnetic signal that is generated to encode information for transmission to suitable receiver apparatus for execution by a data processing apparatus. A computer storage medium, for example, the computer-readable medium, can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical and/or non-transitory components or media (for example, multiple CDs, disks, or other storage devices).

In some implementations, the operations described in this disclosure can be implemented as a hosted service provided on a server in a cloud computing network. For example, the computer-readable storage media can be logically grouped and accessible within a cloud computing network. Servers within the cloud computing network can include a cloud computing platform for providing cloud-based services. The terms "cloud," "cloud computing," and "cloud-based" may be used interchangeably as appropriate without departing from the scope of this disclosure. Cloud-based services can be hosted services that are provided by servers and delivered across a network to a client platform to enhance, supplement, or replace applications executed locally on a client computer. The system can use cloud-based services to quickly receive software upgrades, applications, and other resources that would otherwise require a lengthy period of time before the resources can be delivered to the system.

The operations described in this disclosure can be implemented as operations performed by a data processing apparatus on data stored on one or more computer-readable storage devices or received from other sources. The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, for example, an FPGA (field programmable gate array) or an ASIC (application-specific integrated circuit). The apparatus can also include, in addition to hardware, code that creates an execution environment for the computer program in question, for example, code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (for example, one or more scripts stored in a markup language document), in a single file dedicated to the program in question, or in multiple coordinated files (for example, files that store one or more modules, sub-programs, or portions of code). A computer program can be deployed to be executed on one computer or on multiple computers that are located at one site or distributed across multiple sites and interconnected by a communication network.

The processes and logic flows described in this disclosure can be performed by one or more programmable processors executing one or more computer programs to perform actions by operating on input data and generating output. The processes and logic flows can also be performed by, and apparatus can also be implemented as, special purpose logic circuitry, for example, an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, for example, magnetic, magneto-optical disks, or optical disks. However, a computer need not have such devices. Moreover, a computer can be embedded in another device, for example, a mobile telephone, a personal digital assistant (PDA), a mobile audio or video player, a game console, a Global Positioning System (GPS) receiver, or a portable storage device (for example, a universal serial bus (USB) flash drive), to name just a few. Devices suitable for storing computer program instructions and data include all forms of non-volatile memory, media and memory devices, including by way of example semiconductor memory devices, for example, EPROM, EEPROM, and flash memory devices; magnetic disks, for example, internal hard disks or removable disks; magneto-optical disks; and CD-ROM and DVD-ROM disks. The processor and the memory can be supplemented by, or incorporated in, special purpose logic circuitry.

To provide for interaction with a user, implementations of the subject matter described in this disclosure can be implemented on a computer having a display device, for example, a CRT (cathode ray tube) or LCD (liquid crystal display) or a LED (Light Emitting Diode) monitor, for displaying information to the user, and a keyboard, a pointing device, for example, a mouse or a trackball, or a microphone and speaker (or combinations of them) by which the user can provide input to the computer. Other kinds of devices can be used to provide for interaction with a user as well; for example, feedback provided to the user can be any form of sensory feedback, for example, visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Implementations of the subject matter described in this disclosure can be implemented in a computing system that includes a back-end component, for example, as a data server, or that includes a middleware component, for example, an application server, or that includes a front-end component, for example, a client computer having a graphical user interface or a Web browser through which a user can interact with an implementation of the subject matter described in this disclosure, or any combination of one or more such back-end, middleware, or front-end components. The components of the system can be interconnected by any form or medium of digital data communication, for example, a communication network. Examples of communication networks include a local area network ("LAN") and a wide area network ("WAN"), an inter-network (for example, the Internet), and peer-to-peer networks (for example, ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some implementations, a server transmits data (for example, an HTML page) to a client device (for example, for purposes of displaying data to and receiving user input from a user interacting with the client device). Data generated at the client device (for example, a result of the user interaction) can be received from the client device at the server.

While this disclosure contains many specific implementation details, these should not be construed as limitations on the scope of any implementations or of what may be claimed, but rather as descriptions of features specific to particular implementations of particular implementations. Certain features that are described in this disclosure in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

The invention claimed is:

1. A computer-implemented method to upgrade computer nodes included in a computer network, the method comprising:

identifying a request to upgrade a first computer node in a computer network, the first computer node being a first acceleration node to accelerate transmission of resources between a client computer system and a server computer system connected through the first computer node;
identifying, by the first computer node, a second computer node in the computer network linked to the first computer node, the second computer node being a second acceleration node to accelerate transmission of resources between the client computer system and the server computer system connected through the second computer node;
establishing, by the first computer node, a bypass link to the second computer node from the first computer node, the bypass link configured to transmit new connections received for handling by the first computer node to the second computer node for handling by the second computer node during upgrading of the first computer node; and
upgrading the first computer node upon establishing the bypass link in response to identifying the request.

2. The method of claim 1, further comprising:
after establishing the bypass link and before upgrading the first computer node, executing the first computer node to handle existing connections received by the first computer node before the bypass link was established; and
upgrading the first computer node upon determining that the first computer node has completed handling the existing connections.

3. The method of claim 1, further comprising:
determining that the first computer node has completed upgrading;
executing the second computer node to handle connections being transmitted to the second computer node through the bypass link after the first computer node has completed upgrading; and
terminating the bypass link after the connections being transmitted to the second computer node have been handled.

4. The method of claim 3, wherein determining that the first computer node has completed upgrading comprises executing the first computer node to transmit a completion message to the bypass link after the first computer node has completed upgrading.

5. The method of claim 1, wherein identifying the second computer node comprises determining that the second computer node is configured to handle connections that are substantially similar to connections that the first computer node is configured to handle.

6. The method of claim 1, wherein identifying the second computer node comprises transmitting a request to the second computer node to handle connections that are substantially similar to connections that the first computer node is configured to handle.

7. The method of claim 1, wherein establishing the bypass link to the second computer node comprises:
splitting, at the first computer node, a receiver configured to receive connections into a first sub-receiver and a second sub-receiver;
executing the first sub-receiver to not transmit connections to the first computer node; and
executing the second sub-receiver to transmit connections to the second computer node.

8. The method of claim 1, further comprising:
automatically and without user intervention, identifying a third computer node in the computer network for upgrading after the first computer node has completed upgrading, wherein the third computer node is an acceleration node to accelerate transmission of resources between the client computer system and the server computer system connected through the third computer node; and
upgrading the third computer node.

9. The method of claim 8, wherein identifying the third computer node for upgrading comprises identifying the third computer node based on a functionality executed by the third computer node.

10. The method of claim 9, wherein the third computer node executes a first functionality and a fourth computer node to be upgraded executes a second functionality, wherein computer nodes executing the first functionality are to be upgraded before computer nodes executing the second functionality.

11. The method of claim 8, wherein identifying the third computer node for upgrading comprises identifying the third computer node based on a priority of the third computer node.

12. The method of claim 11, wherein the third computer node and a fourth computer node to be upgraded execute a same functionality, and wherein the third computer node has a higher priority than the fourth computer node.

13. The method of claim 8, wherein the third computer node was disconnected from the network when the request to upgrade the first computer node was identified, and wherein identifying the third computer node for upgrading comprises determining that the third computer node has been reconnected to the network after identifying the request to upgrade the first computer node.

14. The method of claim 1, wherein establishing the bypass link to the second computer node from the first computer node comprises:
generating a temporary clone of the first computer node, the temporary clone configured to execute one or more functionalities of the first computer node; and
designating the temporary clone as the second computer node such that the bypass link is configured to transmit the new connections received for handling by the first computer node to the temporary clone for handling by the temporary clone during upgrading of the first computer node.

15. The method of claim 1, wherein upgrading the first computer node comprises identifying an upgrading time to upgrade the first computer node, wherein the upgrading time is a time of day during which network traffic in the computer network is slowest, and wherein the method further comprises:
analyzing network traffic during a first day to identify a time when the network traffic is slowest; and
establishing the identified time as the upgrading time for a second day that follows the first day.

16. The method of claim 15, wherein the upgrading time is a time at which no connections to the first computer node are detected.

17. A non-transitory computer-readable medium storing instructions executable by data processing apparatus to perform operations comprising:
identifying a request to upgrade a first computer node in a computer network, the first computer node being a first acceleration node to accelerate transmission of resources between a client computer system and a server computer system connected through the first computer node;

identifying, by the first computer node, a second computer node in the computer network linked to the first computer node, the second computer node being a second acceleration node to accelerate transmission of resources between the client computer system and the server computer system connected through the second computer node;

establishing, by the first computer node, a bypass link to the second computer node from the first computer node, the bypass link configured to transmit new connections received for handling by the first computer node to the second computer node for handling by the second computer node during upgrading of the first computer node; and upgrading the first computer node upon establishing the bypass link in response to identifying the request.

18. The medium of claim 17, the operations further comprising:

after establishing the bypass link and before upgrading the first computer node, executing the first computer node to handle existing connections received by the first computer node before the bypass link was established; and upgrading the first computer node upon determining that the first computer node has completed handling the existing connections.

19. A system comprising:

data processing apparatus; and a computer-readable medium storing instructions executable by the data processing apparatus to perform operations comprising:

identifying a request to upgrade a first computer node in a computer network, the first computer node being a first acceleration node to accelerate transmission of resources between a client computer system and a server computer system connected through the first computer node;

identifying, by the first computer node, a second computer node in the computer network linked to the first computer node, the second computer node being a second acceleration node to accelerate transmission of resources between the client computer system and the server computer system connected through the second computer node;

establishing, by the first computer node, a bypass link to the second computer node from the first computer node, the bypass link configured to transmit new connections received for handling by the first computer node to the second computer node for handling by the second computer node during upgrading of the first computer node; and upgrading the first computer node upon establishing the bypass link in response to identifying the request.

20. The system of claim 19, the operations further comprising:

automatically and without user intervention, identifying a third computer node in the computer network for upgrading after the first computer node has completed upgrading based on at least one of a functionality executed by the third computer node or a priority associated with the third computer node, wherein the third computer node is an acceleration node to accelerate transmission of resources between the client computer system and the server computer system connected through the third computer node; and upgrading the third computer node.

* * * * *